United States Patent
Smaglinski et al.

(10) Patent No.: US 9,375,787 B2
(45) Date of Patent: Jun. 28, 2016

(54) METHOD FOR PRODUCING A LEADTHROUGH FOR AN OPTICAL CONDUCTOR

(75) Inventors: Ingo Smaglinski, Mainz (DE); Gerhard Himmelsbach, Gross-Gerau (DE); Thomas Petigk, Rüsselsheim (DE)

(73) Assignee: HUBER+SUHNER Cube Optics AG, Mainz (DE)

( * ) Notice: Subject to any disclaimer, the term of this patent is extended or adjusted under 35 U.S.C. 154(b) by 553 days.

(21) Appl. No.: 13/637,084

(22) PCT Filed: Mar. 22, 2011

(86) PCT No.: PCT/EP2011/054296
§ 371 (c)(1),
(2), (4) Date: Nov. 9, 2012

(87) PCT Pub. No.: WO2011/117219
PCT Pub. Date: Sep. 29, 2011

(65) Prior Publication Data
US 2013/0202475 A1    Aug. 8, 2013

(30) Foreign Application Priority Data
Mar. 25, 2010  (DE) .................. 10 2010 003 302

(51) Int. Cl.
B22F 5/10      (2006.01)
G02B 6/42     (2006.01)
B22F 3/22      (2006.01)

(52) U.S. Cl.
CPC . B22F 5/10 (2013.01); B22F 5/106 (2013.01); G02B 6/4248 (2013.01); *B22F 3/225* (2013.01); *B22F 2005/103* (2013.01)

(58) Field of Classification Search
CPC ................................... G02B 6/24; B22F 5/10
USPC ............................................................... 419/8
See application file for complete search history.

(56) References Cited

U.S. PATENT DOCUMENTS

| 4,810,277 A | 3/1989 | Waitl et al. |
| 6,435,731 B1* | 8/2002 | Yamaguchi et al. ............. 385/78 |
| 2002/0118927 A1* | 8/2002 | Takada et al. ................... 385/78 |

FOREIGN PATENT DOCUMENTS

| DE | 1 923 138 A | 11/1969 |
| DE | 37 04 790 A1 | 8/1988 |
| DE | 37 42 893 A1 | 7/1989 |
| DE | 693 03 489 T2 | 1/1997 |
| EP | 0 105 198 A2 | 4/1984 |
| EP | 0 267 536 A2 | 5/1988 |
| EP | 1 089 100 A2 | 4/2001 |
| JP | 61 007812 A | 1/1986 |
| JP | 2002 250839 A | 9/2002 |

(Continued)

*Primary Examiner* — Jessee Roe
*Assistant Examiner* — Christopher Kessler
(74) *Attorney, Agent, or Firm* — Paul & Paul (57) ABSTRACT

The present invention relates to a method for producing a leadthrough for an optical conductor (V3) in a housing part, comprising the following steps: a) producing granules composed of metal powder and, if appropriate binder, b) providing a mold having a mold space, c) injecting or compressing the granules into the mold in order to produce a molding, d) sintering the molding, e) introducing a passage opening into the molding prior to sintering, f) inserting a tube (V2) into the passage opening prior to sintering, and g) leading the optical conductor through the tube after sintering.

12 Claims, 10 Drawing Sheets

(56) References Cited

FOREIGN PATENT DOCUMENTS

| KR | 20010091145 A | 10/2001 |
| WO | 0072069 A1 | 11/2000 |
| WO | WO02069009 A1 * | 9/2002 |

\* cited by examiner

METHOD FOR PRODUCING A LEADTHROUGH FOR AN OPTICAL CONDUCTOR

BACKGROUND OF THE INVENTION

The present invention relates to a method for producing a leadthrough for an optical conductor in a housing part.

Corresponding leadthroughs are known for example from EP 0 267 536. These are used for hermetically sealed housings of electro-optical or optoelectronic components in order to protect these from external environmental influences, e.g. dust or moisture.

Figure 2:
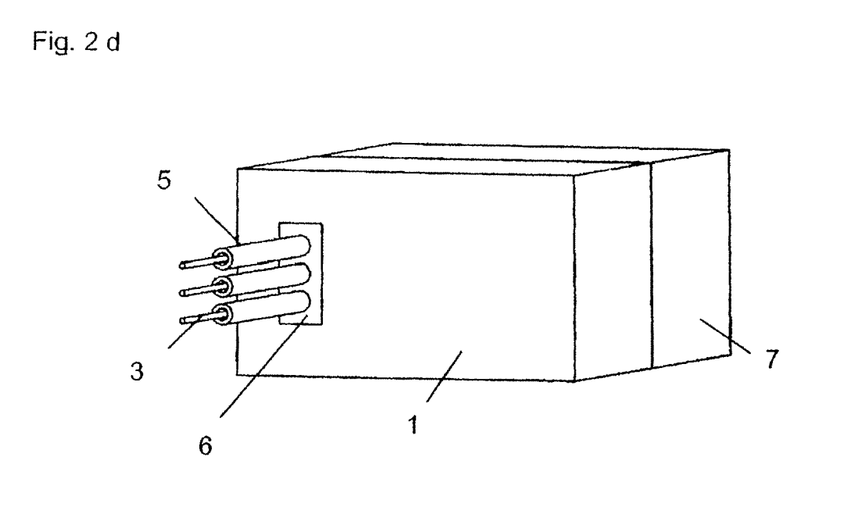
FIGS. 2a to 2d different views of an embodiment of the state of the art.
Figure 2A:
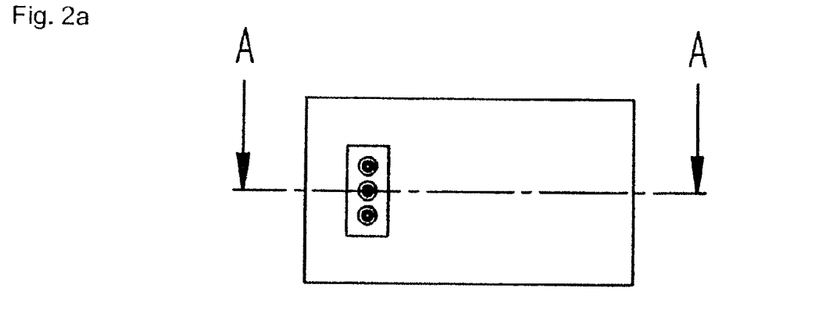
Figures 2B, 2C:
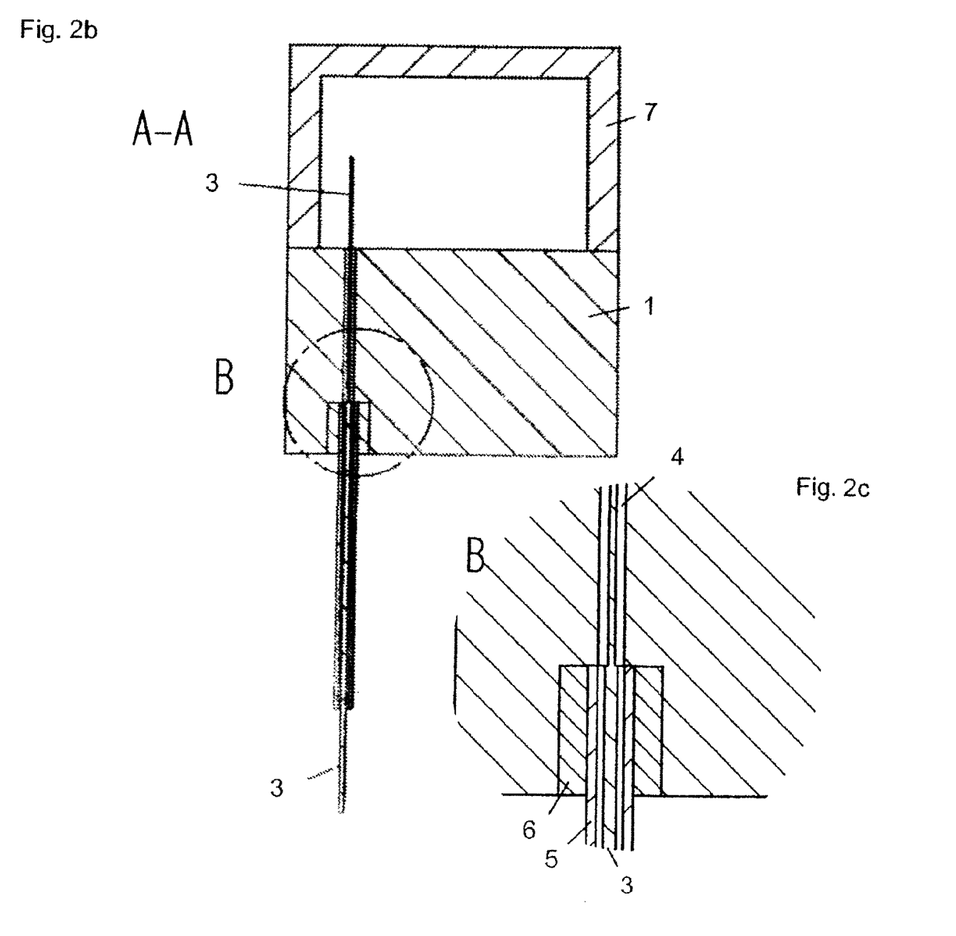

An embodiment of the state of the art is presented in FIGS. 2a-2d. FIG. 2a shows a top view of a housing with a corresponding leadthrough. FIG. 2b is a sectional view along the line A-A in FIG. 2a. The housing consists of two parts 1,7. The leadthrough for a glass fibre 3 is arranged in one part 1. The housing part 1 has a stepped hole into which the glass fibre has been introduced. For sealing off, the glass fibre is glued in the stepped hole with an adhesive 4. Optionally, a protective hose 5 can be used which is glued into the hole and into which the glass fibre is glued.

The leadthrough must be hermetically sealed overall. As the customarily used adhesives, such as e.g. epoxy adhesives, display a degree of permeability to air and water vapour, the hole must be correspondingly long and have as small as possible a cross-section so that, when glued, the result is as long as possible a diffusion length with as small as possible a diffusion cross-section for the adhesive. In particular, the requirement of the long diffusion length means that the housing part 1 must have a thickness which corresponds at least to the diffusion length. As a rule, therefore, merely because of the necessary diffusion length the housing part must be thicker than is necessary on mechanical grounds, which leads to increased material costs and above all a greater space requirement for the component.

As a rule, the housing parts are made by means of methods for cutting from the solid.

In principle, it is desired to produce the housing part in a simpler and above all cheaper way. Production by the injection moulding process is not possible, however, as holes with an aspect ratio greater than 5 cannot be produced with the necessary accuracy for the required small cross-sections by the injection moulding process.

It is also known to produce housing parts by means of powdered metal injection moulding. In powdered metal injection moulding, firstly an injectable granular material comprising powdered metal and binders, usually organic binders, such as e.g. a combination of waxes and plastics, is mixed in a precisely defined proportion by volume.

The resultant injectable granular material can then be converted into a shaped body with the help of the injection moulding process.

The injection moulding can be carried out on conventional injection moulding machines, such as are known for example from plastics processing. It is to be borne in mind that, because of the high proportion by volume of plastic and depending on the binder used and the powdered metal, the thus-produced green bodies are approx. 15 to 20% larger than the product to be produced. The green body nevertheless has all the typical geometric features of the finished component.

Generally, in the next step a large part of the organic binder which gave the powdered metal its injectable properties is removed again from the green body. The residual binder content is reduced by the so-called debindering process to approx. 2 to 3%, which guarantees that the shaped body still has a degree of stability.

In the last step the components are sintered at temperatures a little below their melting point (usually between 1200° C. and 1400° C.) and there obtain their ultimate size. The thus-finished metallic part can in principle have all geometric shapes that can be produced by means of injection moulding.

However, even with this method it is basically not possible to produce passage openings with the required small cross-sections and an aspect ratio of more than 5 which are, however, necessary for a hermetically sealing glass fibre leadthrough.

Starting from the described state of the art it is therefore the object of the present invention to provide a method for producing a leadthrough for an optical conductor in a housing which is cost-favourable and also allows the necessary dimensions of the housing part to be minimized.

SUMMARY OF THE INVENTION

According to the invention this object is achieved in that the housing part is produced with the help of a sintering method such as e.g. powdered metal injection moulding, wherein additionally before the sintering a passage opening is introduced into the shaped body, in that before the sintering a tube is inserted into the passage opening with the result that the tube is sintered together with the shaped body and wherein finally the optical conductor, e.g. the glass fibre is guided through the tube after the sintering.

The introduction of the passage opening can take place either during the injection moulding or after the injection moulding in a separate workstep.

The passage opening is chosen some 10 to 15% larger than the external diameter of the tube, as the passage opening reduces correspondingly during sintering. The material from which the tube is produced is to be matched to the powdered metal used, so that tube and shaped body form a metallurgical bond during the sintering.

Corresponding leadthroughs can be produced in a simple way by the described method.

In the corresponding leadthroughs of the state of the art, the passage openings had to have a certain minimum depth, i.e. the housing part had to have a certain minimum thickness in order to achieve a minimum diffusion length when gluing the glass fibre into the passage opening.

In the method according to the invention, the optical conductor is no longer only introduced into the passage opening, but into the tube. The corresponding diffusion length inside the adhesive must therefore now be provided inside the tube. Therefore it is provided in a preferred embodiment that a tube is used which is longer than the length of the passage opening and which is inserted into the passage opening such that it projects beyond the passage opening at least on one side, preferably on both sides. According to the invention the thickness of the housing part is now no longer set by the necessary diffusion length, but exclusively by geometric requirements and stability requirements.

Therefore, it is now possible through the method according to the invention to produce corresponding passage openings at favourable cost, as the actual housing part can be produced using the customary injection moulding process, wherein the opening with the necessary aspect ratio, to guarantee a hermetically sealing adhesion, is provided by the insertion and subsequent sintering of a tube into a corresponding passage opening.

In a preferred embodiment the passage opening is introduced as a stepped passage opening. In other words, the passage opening widens in one direction. The passage opening thus has a section with a smaller cross-section and a section with a larger cross-section. The tube is dimensioned such that it has an external diameter which is somewhat smaller than the diameter of the section with a smaller diameter, with the result that during the sintering the tube bonds in hermetically sealed manner to the section with a smaller diameter.

Because a further section of the passage opening has a larger cross-section, a substantially annular space is formed around the tube which can for example likewise be filled with adhesive in order to increase the stability of the tube.

Alternatively it is also possible for a recess to be introduced into the shaped body before the sintering, wherein this recess can either be introduced already during the injection moulding or can be generated in a subsequent workstep, wherein the passage opening is then introduced in the region of the recess. Essentially, a stepped passage opening likewise forms as a result. In a further preferred embodiment more than one passage opening is introduced in the region of the recess, wherein one tube each is inserted into every passage opening. In this embodiment several optical conductors, such as e.g. glass fibres, can similarly therefore be guided through the housing part.

In a preferred embodiment the tube can consist of metal, preferably of high-grade steel. Particularly good results have been achieved with austenitic high-grade steel 316L.

The tube can be flared at at least one end, i.e. the tube is widened at at least one end, whereby the threading of the optical waveguide into the tube is simplified.

In this case it is further of advantage if the housing part also has a correspondingly widening passage opening, with the result that the flared section of the tube can be accommodated by the corresponding widened passage opening, with the result that the tube can end flush with the passage opening. The flare and corresponding widening of the passage opening then act as positioning stop for the tube.

In an alternative embodiment the tube is kinked or bent after the sintering. Depending on the desired course of the optical waveguide, it may actually be of advantage if the tube already has a corresponding curvature. In order to simplify the subsequent bending of the tube, the housing part can already be fitted with a corresponding bending block which is best already co-formed during the injection moulding.

After the optical conductor has been guided through the tube the optical conductor is best glued in the tube. It has been shown that it is of advantage if sections of the coating of the optical conductor or glass fibre, i.e. the so-called primary coating, are removed, with the result that inside the tube at least sections of the glass fibre have no coating. The coating is generally realized by PMMA (polymethyl methacrylate), but this is moisture-permeable to a certain degree. A much more sealed leadthrough of the glass fibre can thus be realized by removing the coating and gluing the glass fibre into the tube.

In order to securely bond the glass fibre to the housing part, it is provided in a further preferred embodiment that a protective hose is pulled over the tube and the optical waveguide introduced into the tube.

BRIEF DESCRIPTION OF THE DRAWINGS

Further advantages, features and application possibilities of the present invention become clear with the help of the following description of some preferred embodiments and the associated figures. There are shown in.

DETAILED DESCRIPTION OF THE INVENTION

Figure 1:
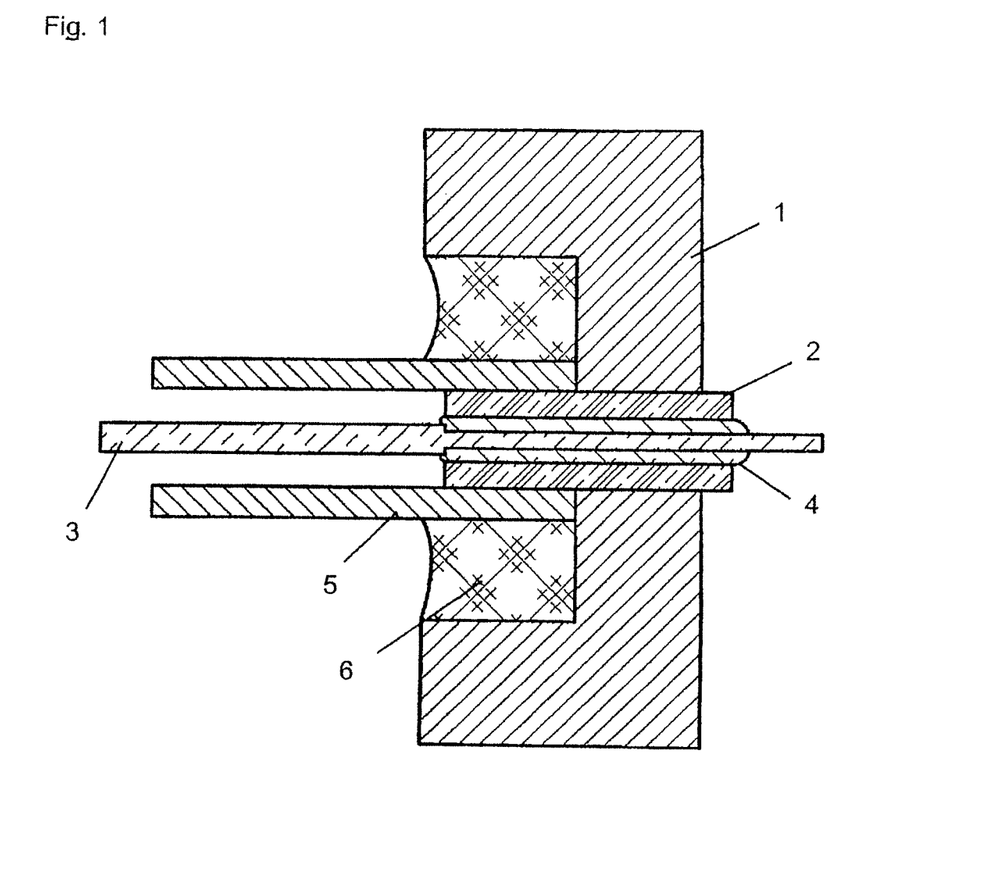
FIG. 1 a sectional view of a schematic representation of the invention.

A sectional view of a schematic representation of the invention is shown in FIG. 1. The housing part 1 is produced by the injection moulding process. Powdered metal is mixed with organic binders in order to produce an injectable granular material. The housing part 1 is formed with a passage opening. This passage opening can either be formed during the injection moulding process or can be introduced afterwards by means of a separate processing step. A metal tube 2 is inserted into this passage opening. The passage opening in the housing part 1 is initially some 10 to 15% larger than the external diameter of the metal tube 2. Housing part 1 and metal tube 2 are sintered in a further workstep. The sintering process causes the housing part 1 to experience a loss of volume. The passage opening is dimensioned such that because of the loss of volume the passage opening forms a solid bond with the metal tube 2 after the sintering. The sintering process thus results in a metallurgical and thus hermetically sealed bond between housing part 1 on the one hand and metal tube 2 on the other. Housing part 1 and metal tube 2 are therefore chosen from materials which make such a metallurgical bond possible.

An optical conductor, e.g. a glass fibre 3, can now be passed through the metal tube 2. Glass fibres generally consist of a core and a sheath. As the sheath is frequently made of a moisture-permeable material, e.g. PMMA, in the embodiment shown in FIG. 1 sections of the sheath of the glass fibre 3 are removed. As can be seen in FIG. 1, the glass fibre 3 has no sheath inside the metal tube 2. Instead, an adhesive 4 is introduced into the metal tube. The passage opening formed through the tube 2 has an aspect ratio, i.e. the ratio of the length of the tube to the smallest lateral extent of the channel formed by the tube, greater than 4, preferably greater than 8.

To protect the glass fibre, a protective hose 5 can be pushed over the tube 2, as shown in FIG. 1. The protective hose 5 can be glued fast to the housing part 1 with the help of an adhesive 6.

It is clear from FIG. 1 that through the provision according to the invention of a metal tube 2 inside a sintered part 1 a passage channel with a very large aspect ratio can be provided, although the aspect ratio of the passage opening already provided in the sintered part is so small that the sintered part can be produced by the injection moulding process.

Different views of an embodiment of the state of the art are shown in FIGS. 2a to 2d, as already described at the outset.

FIG. 2a shows a top view of a housing with a leadthrough for three glass fibres. FIG. 2b shows a sectional view along the line A-A of FIG. 2a and FIG. 2c shows a detail enlargement of FIG. 2b. FIG. 2d shows a perspective view. The housing consists of 2 housing parts 1, 7. One housing part 1 has a passage opening for guiding a glass fibre 3 through. A through-hole is therefore provided in the housing part 1. The glass fibre is glued in this through-hole. As the suitable adhesives display a degree of permeability to air and water, it is essential when forming the leadthrough that a large aspect ratio is preserved. It is important that the diffusion length is chosen as large as possible, while the diffusion cross-section which is formed by the adhesive must be formed as small as possible. For this reason the housing part 1 must have a relatively large thickness in order to accommodate a sufficiently long channel for the adhesive. If a protective hose is used, as shown in the figure, this further increases the necessary length, as the protective hose joins directly onto the hole.

Figure 3A:
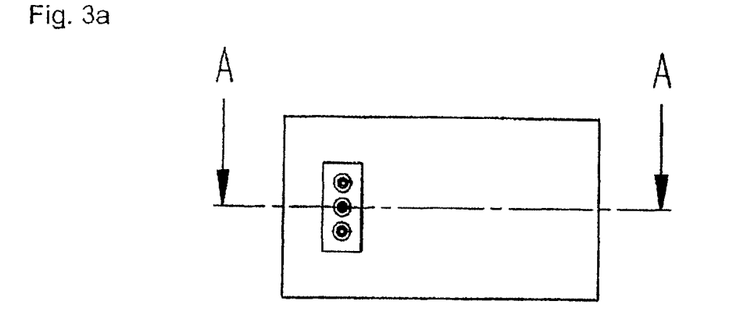
FIGS. 3a to 3c different views of a first embodiment of the invention.
Figure 3B:
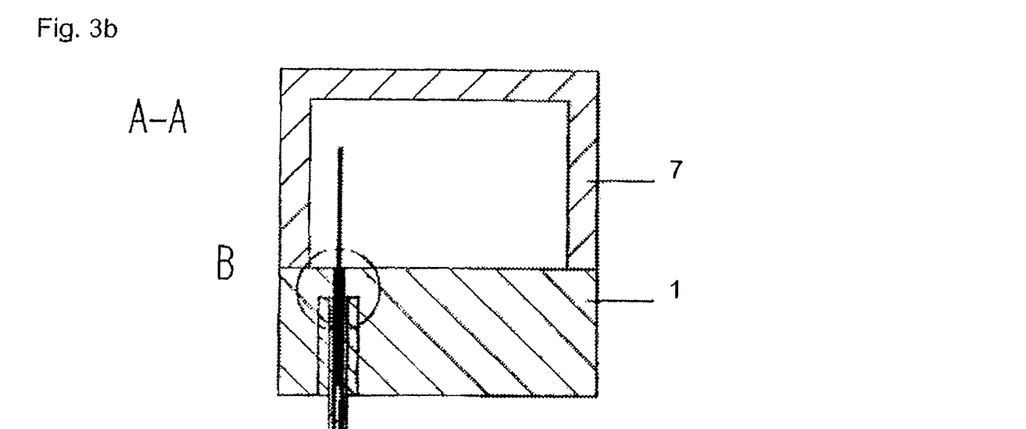
Figure 3C:
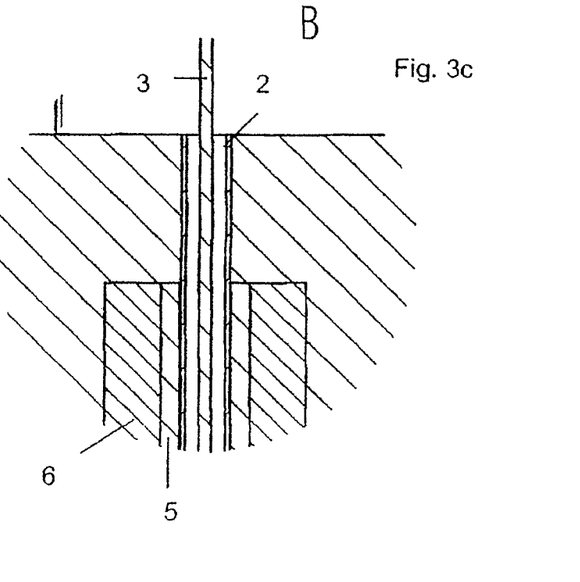

A first embodiment of the present invention is shown in FIGS. 3a to 3c. FIG. 3a shows a top view of a suitable housing. FIG. 3b shows a sectional view along the line A-A of FIG. 3a and FIG. 3c shows a detail enlargement of FIG. 3b.

Here also, the housing consists of two housing parts 1, 7. One housing part 1 has a stepped passage opening. The passage opening has a section with small diameter and a section with large diameter. The section with small diameter has a small aspect ratio compared with the embodiment of the state of the art shown in FIG. 2.

The small aspect ratio makes it possible to produce housing part 1 by the injection moulding process. In order to obtain a hermetically sealed leadthrough, a metal tube 2 is inserted into the passage opening and sintered together with the housing part 1. The channel with large aspect ratio necessary for the hermetically sealed leadthrough is now no longer provided by the passage opening through the housing part 1, but by the metal tube 2.

The glass fibre 3 is arranged in the metal tube 2 and is glued in it. A protective hose 5, the external diameter of which is greater than the internal diameter of the section of the passage opening with smaller cross-section, is pushed over the metal tube. It can be seen that the sleeve 5 is pushed into the passage opening with larger cross-section until the protective hose 5 touches the housing part 1. The protective hose 5 can then also be fixed to the housing part 1 with the help of the adhesive 6.

In the embodiment shown a total of three glass fibres are guided through the housing part 1. In other words, the housing part 1 has a pocket-shaped recess into which three passage openings with small aspect ratio have been introduced. A glass fibre is guided through each of the passage openings. A corresponding protective hose 5 is pushed over each of the glass fibres and all three protective hoses 5 are glued in a joint workstep with the help of the adhesive 6 which is poured into the recess.

Figure 4A:
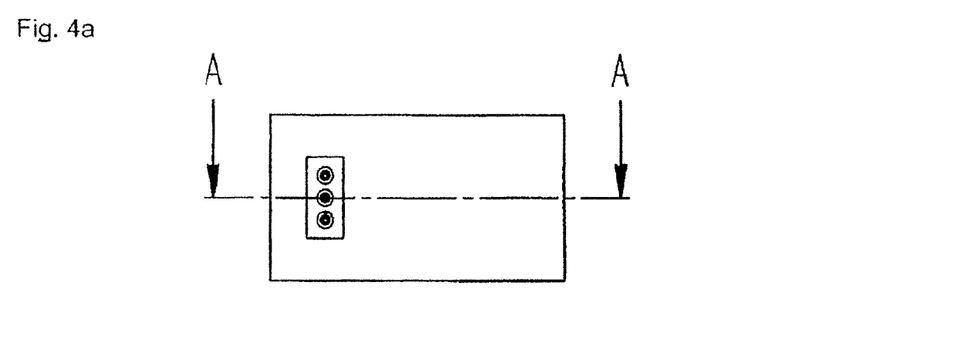
FIGS. 4a to 4c different views of a second embodiment of the invention.
Figures 4B, 4C:
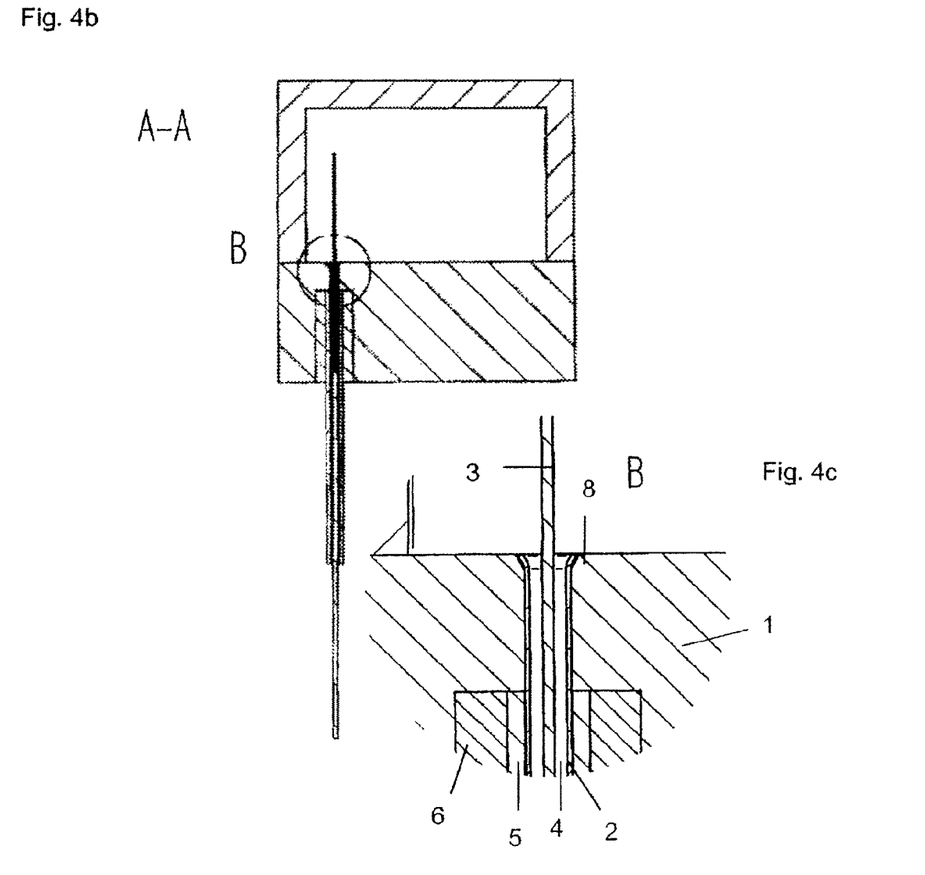

A second embodiment of the invention is shown in FIGS. 4a to 4c. In this embodiment the metal tube 2 is widened or flared at one end. In the same way the mouth region of the passage opening arranged in the housing part 1 is widened, with the result that, as can be seen in particular in FIG. 4c, the widening 8 of the metal tube 2 can be fully accommodated inside the housing part 1 and ends flush with the surface.

Figure 5A:
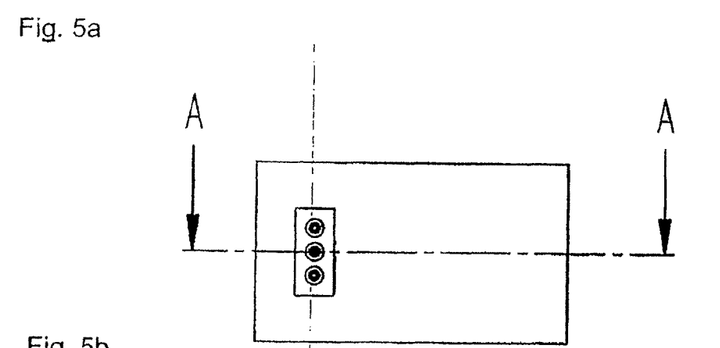
FIGS. 5a to 5c different views of a third embodiment of the invention.
Figures 5B, 5C:
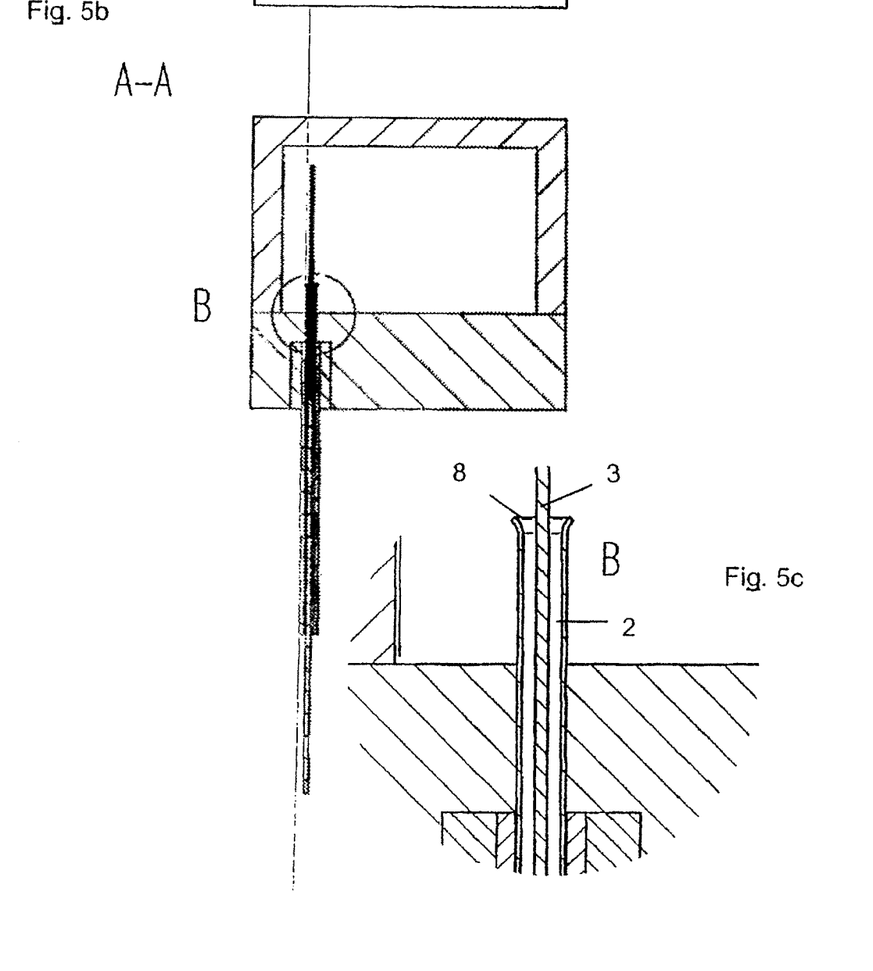

As shown in FIGS. 5a to 5c, which represent a third embodiment of the invention, it is not essential that the metal tube 2 ends flush with the surface of the housing part 1. Rather, it is equally possible that the metal tube 2 projects beyond the surface of the housing part 1, as can be seen in particular in FIG. 5c. Through this measure the thickness of the housing part 1 can be further reduced or the diffusion length easily increased.

Figure 6A:
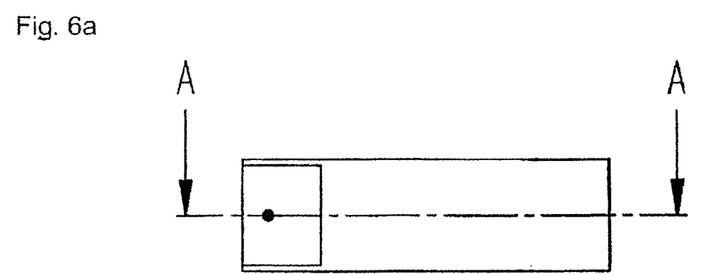
FIGS. 6a to 6c different views of a fourth embodiment of the invention.
Figure 6B:
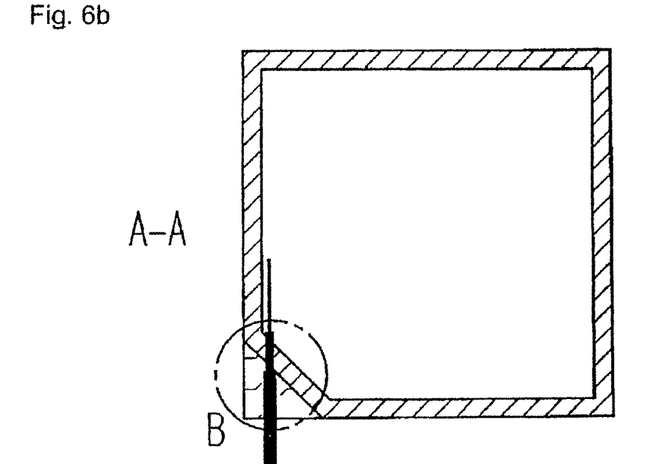
Figure 6C:
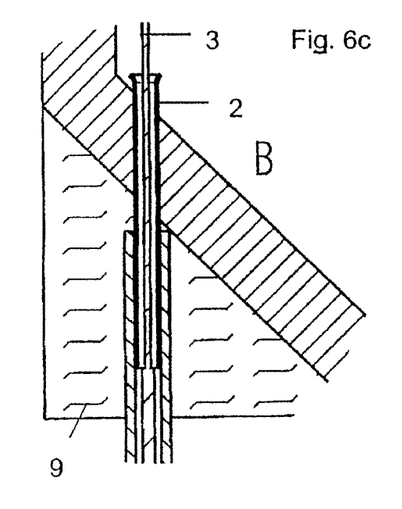

FIGS. 6a to 6c show a fourth embodiment of the invention. It is clear here that the passage opening through the housing part 1 need not be perpendicular to the surface of the housing part, but for example can also be inclined, e.g. at an angle of 45°. In the embodiment shown, the tube is glued in over a relatively large region 9, which improves the stability of the leadthrough.

Nor is it essential that the metal tube 2 runs straight. Therefore the method steps for producing a leadthrough with bent leadthrough channel are shown schematically in FIGS. 7 to 9.

Figure 7A:
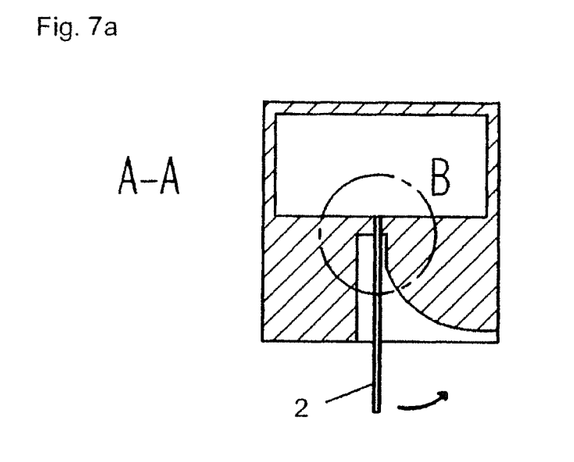
FIGS. 7 to 9 different views of a fifth embodiment of the invention.
Figure 7B:
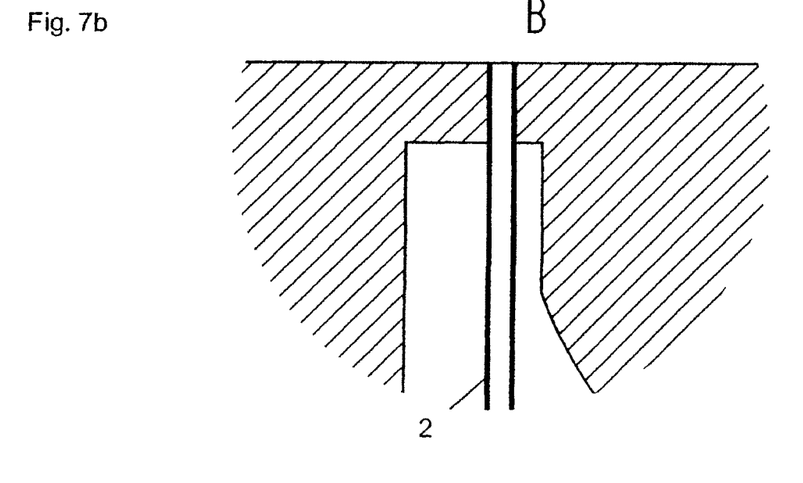

FIG. 7a shows a further embodiment of a housing part 1 with a leadthrough for a glass fibre. The housing part 1 is produced in the same way as in the previously described embodiments. The essential difference is that the recess in the housing part 1, in which the passage opening into which the metal tube 2 is sintered, has a concavely curved wall which can act as a bending block.

Figure 8A:
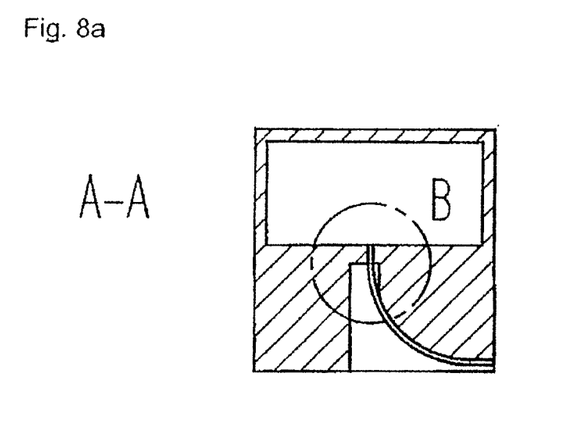
Figure 8B:
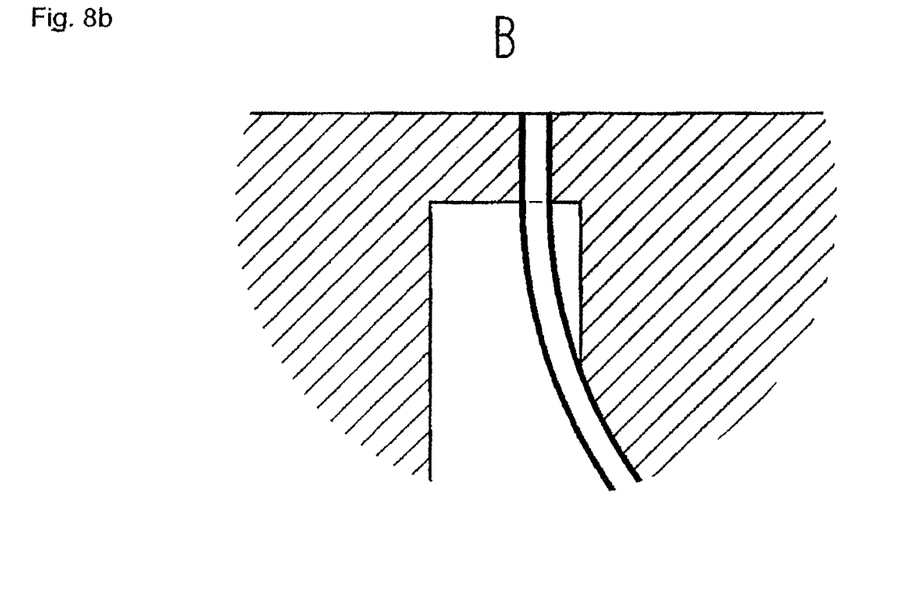

After the sintering in, the metal tube 2 can therefore be curved in the direction of the arrow, with the result that the metal tube 2 lies against the concave bending surface of the housing part 1. This situation is shown in FIGS. 8a and 8b.

Figure 9A:
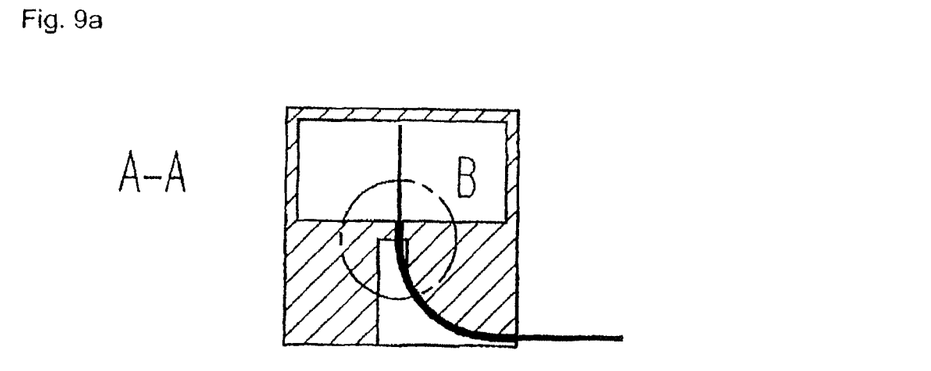
Figure 9B:
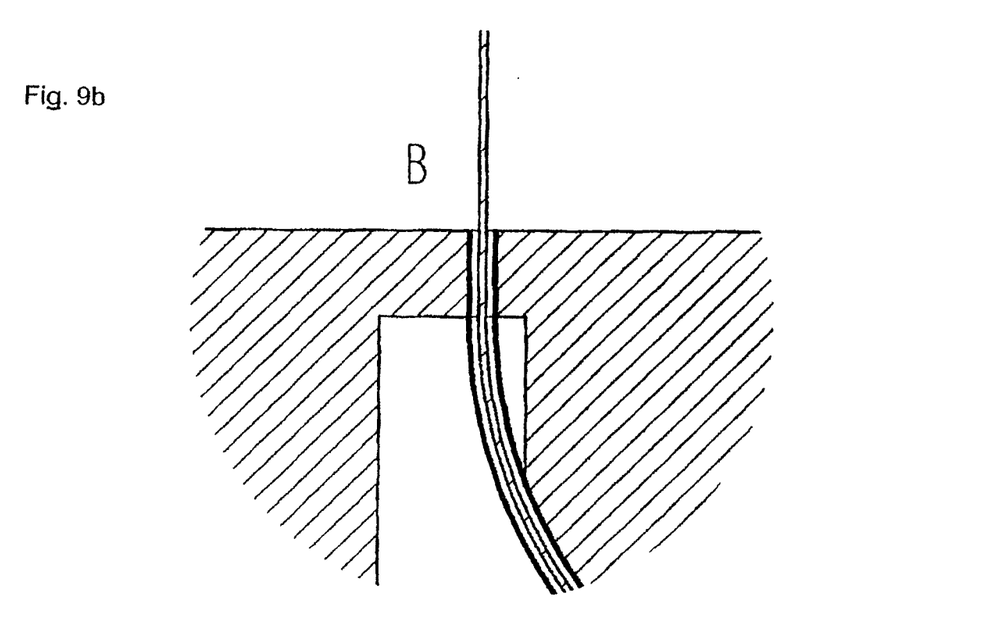

In the next step the glass fibre can then be introduced into the metal tube 2 in the known manner and glued. This situation is shown in FIGS. 9a and 9b.

It is possible, through the method according to the invention, to produce housing parts very cheaply by the injection moulding process. In addition, the components can be dimensioned smaller, as the necessary length of the gluing channel is now no longer fixed via the wall thickness of the component, but via the length of the sintered-in metal tube.

LIST OF REFERENCE NUMBERS

1 Housing part
2 Metal tube
3 Glass fibre
4 Adhesive
5 Protective hose
6 Adhesive
7 Housing part
8 Widening
9 Gluing

The invention claimed is:

1. Method for producing a leadthrough for an optical conductor in a housing part with the steps:
 a) producing a granular material from powdered metal and optionally binders,
 b) providing a mould with a mould space,
 c) injecting or pressing the granular material into the mould to produce a shaped part,
 d) sintering the shaped part, characterized by the additional steps
 e) introducing a passage opening having a length into the shaped part before the sintering,
 f) inserting a tube into the passage opening before the sintering and
 g) guiding the optical conductor through the tube after the sintering.

2. Method according to claim 1, characterized in that in step f) a tube is used which is longer than the length of the passage opening and which is inserted into the passage opening such that it projects beyond the passage opening at least on one side.

3. Method according to claim 1 or 2, characterized in that in step e) a stepped passage opening is introduced.

4. Method according to claim 1 or 2, characterized in that the tube consists of high-grade steel.

5. Method according to one of claim 1 or 2, characterized in that the tube is flared at at least one end.

6. Method according to one of claim 1 or 2, characterized in that before the sintering a recess is introduced into the shaped part and in that in step e) the passage opening is introduced in the region of the recess, wherein more than one passage opening is introduced in the region of the recess and one tube each is inserted into every passage opening.

7. Method according to one of claim 1 or 2, characterized in that after the sintering the tube is kinked or bent, wherein in step b) a mould is provided which guarantees that the shaped part has a bending block.

8. Method according to one of claim 1 or 2 characterized in that after step g) the optical conductor is glued in the tube.

9. Method according to one of claim 1 or 2, characterized in that a glass fibre is used as optical conductor, wherein sections of the coating of the glass fibre are removed.

10. Method according to one of claims 1 or 2, characterized in that a protective hose is pulled over tube and optical waveguide introduced into the tube.

11. Method according to one of claim 1 or 2, characterized in that in step a) an injectable granular material of metal powder and binders is produced, in that in step b) an injection mould is produced, in that in step c) the granular material is injected into the injection mould, and in that after step c) the shaped part is removed from the injection mould.

12. Method according to claim 1, characterized in that in step f) a tube is used which is longer than the length of the passage opening and which is inserted into the passage opening such that it projects beyond the passage opening on both sides.

* * * * *